United States Patent [19]

Oliver et al.

[11] 3,985,407
[45] Oct. 12, 1976

[54] BEARINGS FOR RAILWAY VEHICLES
[75] Inventors: Robert Oliver, Hargrove; William John Waterman, Bourne End; Hamish Dundas Wilson, Maidenhead, all of England
[73] Assignee: Vandervell Products Limited, England
[22] Filed: Dec. 19, 1975
[21] Appl. No.: 642,245

Related U.S. Application Data
[63] Continuation of Ser. No. 335,131, Feb. 23, 1973, abandoned.

[52] U.S. Cl. .............................. 308/237 R; 308/53; 308/56; 308/DIG. 8
[51] Int. Cl.² ............................................. F16C 17/00
[58] Field of Search ............... 308/DIG. 8, 237, 53, 308/56

[56] References Cited
UNITED STATES PATENTS
1,684,146  9/1928  Ripley .................................. 308/56
2,288,635  7/1942  Lyons .................................. 308/56

FOREIGN PATENTS OR APPLICATIONS
567,185   2/1945   United Kingdom ................... 308/56
126,650   4/1920   United Kingdom ................... 308/56
225,079   11/1924  United Kingdom ................... 308/56

Primary Examiner—Ronald H. Lazarus
Attorney, Agent, or Firm—Mawhinney & Mawhinney & Connors

[57] ABSTRACT

The bearing for a railway vehicle axle comprises a bearing block of aluminium alloy having a thermal conductivity in excess of 0.20 of cal/sec/cm. cube/°C. The block has a part-cylindrical bore and a bearing surface of babbitt is provided on the bore and ends of the block to support an axle of a railway vehicle.

1 Claim, 1 Drawing Figure

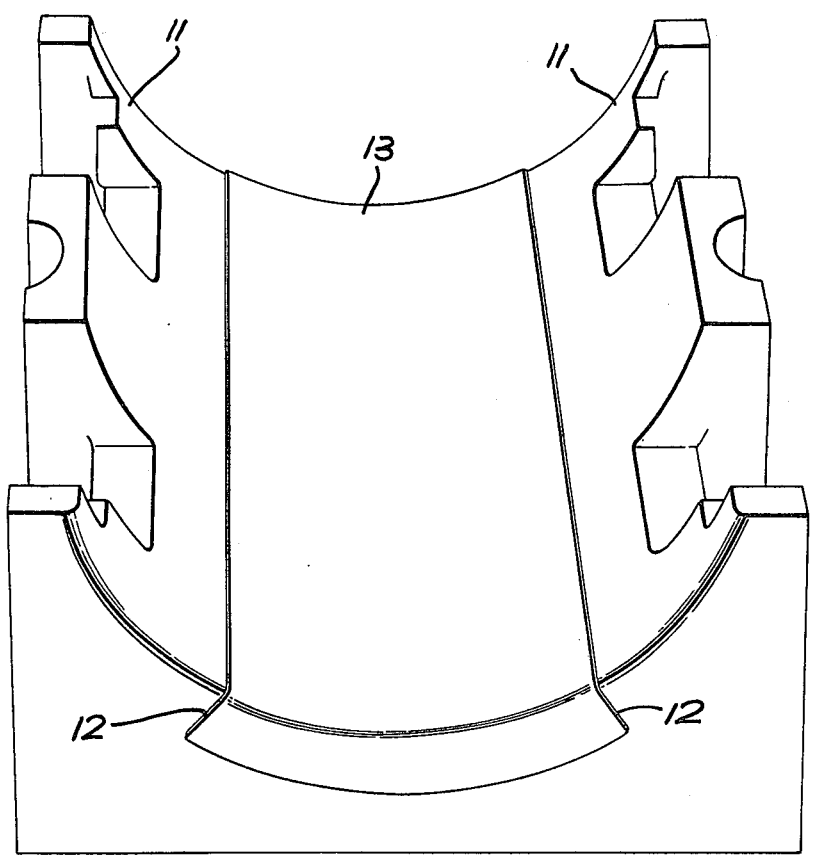

BEARINGS FOR RAILWAY VEHICLES

This is a continuation of application Ser. No. 335,131 filed Feb. 23, 1973, now abandoned.

BACKGROUND OF THE INVENTION

1. Field of the Invention

This invention relates to bearings for railway vehicle axles.

2. Description of the Prior Art

The conventional bearing for a railway vehicle axle comprises a brass bearing block having a part-cylindrical bore to receive the axle which bore is coated with a bearing material such as babbitt. The problem with such bearings is that overheating frequently occurs due often to poor lubrication and the bearing material is then rapidly worn away. If the overheating is not promptly detected all the bearing material may be worn away and the axle then runs on the brass block which is a poor bearing material and damage to the axle usually results. Furthermore the brass block has a high scrap value. The bearing blocks are frequently stolen from the vehicle of a train leaving the train immobile. Certain railway vehicles use roller bearings instead of bearing blocks and whilst such bearings overcome the above difficulties, their cost is considerably greater than that of the simple bearing block.

SUMMARY OF THE INVENTION

The invention provides a bearing for a railway vehicle axle comprising a bearing block cast in aluminium alloy and having a part-cylindrical bore extending along one side thereof to receive an axle of a railway vehicle, said bore having a lining of bearing material.

BRIEF DESCRIPTION OF THE DRAWING

The drawing is a perspective view of a bearing for a railway vehicle axle.

DESCRIPTION OF THE PREFERRED EMBODIMENT

The drawing shows a bearing for a railway vehicle axle comprisng an aluminium alloy bearing block 10 having a part cylindrical bore 11 extending along the length thereof. A shallow recess 12 is cut in the surface of the bore 11 along the length thereof over a 65° segment of the bore. The recess extends around the ends of the bore into the end faces of the block. The recess contains a layer 13 of a bearing material such as lead or tin based babbitt which stands proud of the surface of the block and provides a bearing surface supporting the axle for rotation and provides thrust faces at the ends of the block for limiting axial movement of the axle.

The bearing illustrated may be manufactured using one of the following methods. The block is cast in an aluminium alloy which is a good heat conductor having a thermal conductivity in excess of 0.20 cal/sec/cm cube/° C. One suitable alloy is an aluminium silicon alloy having the following composition:

12% silicon, 1% copper, 1% nickel, 1% manganese, remainder aluminium.

The bearing block is first degreased to remove surface contamination in trichloroethylene vapour or by other conventional means, prior to alkaline cleaning in a solution of the following composition:

Sodium carbonate 10–15 g/l
Trisodium phosphate 10–15 g/l
Temperature 90° C

Simple immersion for 3 minutes. An acid dip is essential after the alkaline treatment and after thorough rinsing the bearing block is immersed in a solution of composition:

| Nitric acid SG 1.42 | 3 parts |
|---|---|
| Hydrofluoric acid (40%) | 1 part |
| Room temperature | |

Time of immersion will be approximately 30 seconds but will depend on the quantity of smut to be removed after the alkaline clean stage.

After rinsing, the block is masked except for the recess by first applying a lacquer to those parts not required to be plated and when this is dry, dipping the whole block in molten wax. When hard, the wax may be stripped off the recess prior to processing. The bearing block recess is then coated with zinc by the double immersion process, which consists of depositing a layer of zinc on to the aluminium-silicon block by simple immersion from a sodium zincate solution, stripping this coating off the recess with nitric acid and re-coating with zinc by re-immersion in the sodium zincate solution.

The zincate solution is of the following composition

| Sodium hydroxide | 500 g/l |
|---|---|
| Zinc oxide | 100 g/l |
| Ferric chloride | 1 g/l |
| Rochelle salt | 5 g/l |

The solution is used at room temperature and the block immersed for a time such that uniform coverage of the recess with zinc is achieved. The block is rinsed, dipped in concentrated nitric acid to remove the zinc coating, rinsed and re-immersed in the sodium zincate solution until the recess is coated uniformly with zinc. This double immersion process results in a good bond between the zinc coating and the aluminium silicon alloy.

The recess may then be electroplated with copper from any conventional copper cyanide plating bath.

Further, it may be desirable to plate the copper coating with yet another metal to promote bonding of the cast or electrodeposited bearing liner. Tin has been found to be suitable, and a layer of this metal may be electroplated onto the copper from a conventional sodium or potassium stannate plating solution.

The layer of lead or tin based babbitt is then cast into the recess.

Examples of specific bearing metals which are suitable for casting onto the lining are as follows:

a. 1% Sn, 15% Sb, 1.0% As, the balance Pb
b. 10% Sn, 15% Sb, 0.5% As, 0.25% Cu, the balance Pb
c. 6% Sn, 10% Sb, 0.5% As, 0.9% Cu, 0.5% Cd, the balance Pb
d. 10% Sn, 13.8% Sb, 0.5% As, 0.9% Cu, 0.5% Cd, the balance Pb
e. 7.5% Sb, 3.25% Cu, the balance Sn
f. 6% Sn, 10% Sb, the balance Pb.

Alternatively, the recess 12 is omitted from the block and a lead-tin layer of up to about 0.100 inches is electrodeposited from a lead-tin fluoborate type plating bath or lead is deposited on the bore and ends of the block from a lead fluoborate bath followed in latter instance by electrodeposition of indium from a bath as described in UK Patent No. 1,176,787, the surfaces of the block not required to be plated being masked.

We claim:

1. In combination with the journal on a railway vehicle wheel set, a bearing for said journal comprising an elongate generally rectangular block consisting of a cast aluminium silicon alloy containing only a minimal amount of copper on the order, at most, of not more than 1% and having a heat transfer coefficient of not less than 0.20 cgs units, the block having end faces and an upper and lower elongate side, said upper side being substantially flat and said lower side being part cylindrical and being composed of a central longitudinally extending segment which extends over an arc located within the part cylindrical side and longitudinal side segments extending downwardly from the side boundaries of the central segment, said central and side segments having their longitudinal axes extending mutually parallel along the length of the block between the end faces thereof and a bearing lining of babbit metal extending along the lower side of the block and being confined laterally solely within the area of the central segment and extending over the end faces in line with the central segment, and under which the journal rotates in engagement therewith, the frictional heat generated between said journal and the babbit lining being substantially localized in the zone of the crown area of the babbit lining, and a heat transmitting metallic path at such zone to conduct the heat upwardly into the air stream.

* * * * *